United States Patent
Sugiura et al.

(10) Patent No.: US 8,068,963 B2
(45) Date of Patent: Nov. 29, 2011

(54) CONTROL DEVICE FOR AUTOMATIC TRANSMISSION

(75) Inventors: Tadashi Sugiura, Anjo (JP); Yosuke Takei, Anjo (JP); Hideaki Ogasawara, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 395 days.

(21) Appl. No.: 12/318,226

(22) Filed: Dec. 23, 2008

(65) Prior Publication Data

US 2009/0171542 A1 Jul. 2, 2009

(30) Foreign Application Priority Data

Dec. 27, 2007 (JP) ................................ 2007-338148

(51) Int. Cl.
*B60W 10/10* (2006.01)
(52) U.S. Cl. .......................... 701/51; 477/140
(58) Field of Classification Search .................... 701/51, 701/65, 57, 60, 61; 477/97, 901, 46, 48, 477/49, 110, 120
See application file for complete search history.

(56) References Cited

U.S. PATENT DOCUMENTS

| | | | |
|---|---|---|---|
| 4,905,530 A | 3/1990 | Stehle et al. | |
| 4,987,792 A | 1/1991 | Mueller et al. | |
| 5,044,220 A | 9/1991 | Raff et al. | |
| 5,062,314 A | 11/1991 | Maier et al. | |
| 5,070,740 A | 12/1991 | Giek et al. | |
| 6,106,434 A * | 8/2000 | Ibamoto et al. | 477/120 |
| 6,199,001 B1 * | 3/2001 | Ohta et al. | 701/51 |
| 6,278,928 B1 | 8/2001 | Aruga et al. | |
| 6,626,797 B2 * | 9/2003 | Shiiba et al. | 477/97 |
| 6,834,224 B2 * | 12/2004 | Shiiba et al. | 701/65 |
| 7,530,923 B2 * | 5/2009 | Saito et al. | 477/122 |
| 7,704,187 B2 * | 4/2010 | Saito et al. | 477/110 |
| 2003/0232680 A1 * | 12/2003 | Matsunaga et al. | 475/131 |
| 2007/0270279 A1 * | 11/2007 | Saitoh et al. | 477/110 |
| 2009/0171539 A1 | 7/2009 | Sugiura et al. | |
| 2009/0171540 A1 | 7/2009 | Sugiura et al. | |
| 2009/0171541 A1 | 7/2009 | Sugiura et al. | |

FOREIGN PATENT DOCUMENTS

| | | |
|---|---|---|
| JP | A-6-241301 | 8/1994 |
| JP | A-10-38068 | 2/1998 |
| JP | A-10-324169 | 12/1998 |
| JP | A-2006-38041 | 2/2006 |
| JP | A-2009-52723 | 3/2009 |
| JP | A 2009-156433 | 7/2009 |
| JP | A 2009-156435 | 7/2009 |
| JP | A 2009-156436 | 7/2009 |

* cited by examiner

*Primary Examiner* — Thomas Black
*Assistant Examiner* — Marthe Marc-Coleman
(74) *Attorney, Agent, or Firm* — Oliff & Berridge, PLC

(57) ABSTRACT

A control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device includes a manual shift control unit that changes and sets the gear ratio after downshift depending on road conditions when the downshift command has been operated by the manual operation device in the manual shift mode, and performs the downshift to the gear ratio that has been changed and set.

14 Claims, 9 Drawing Sheets

F I G . 2
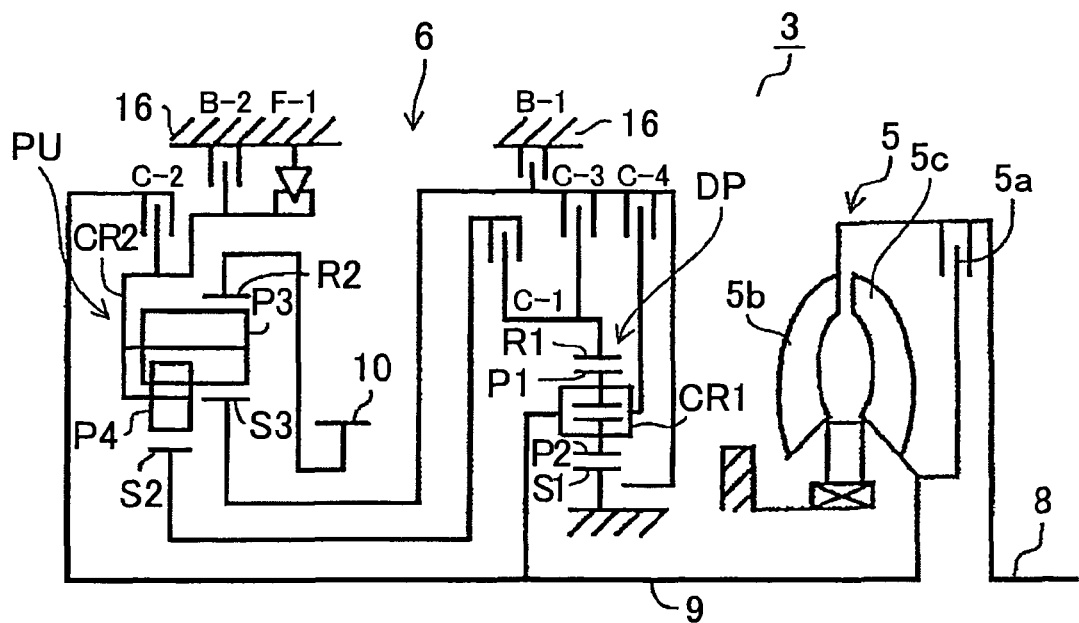
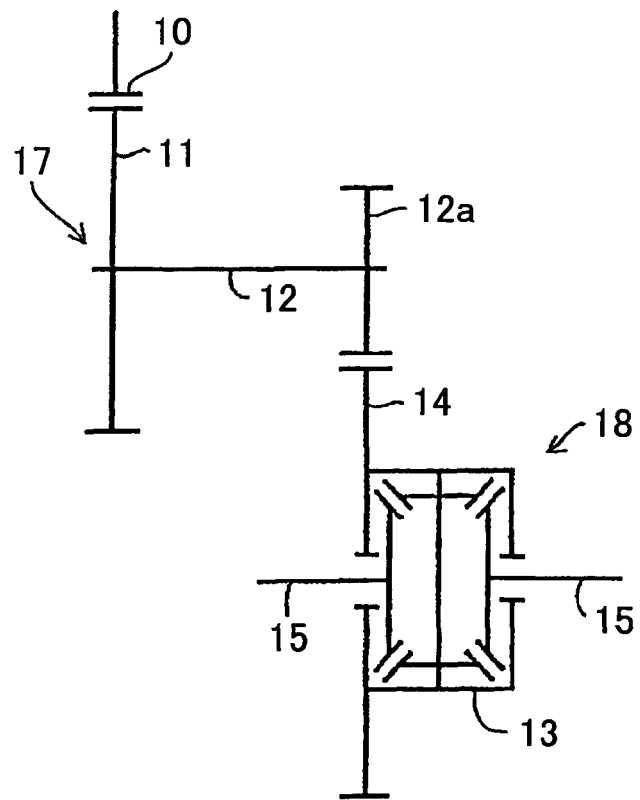

FIG.3

|      | C-1 | C-2 | C-3 | C-4 | B-1 | B-2 | F-1 |
|------|-----|-----|-----|-----|-----|-----|-----|
| 1st  | ●   |     |     |     |     | (●) | ●   |
| 2nd  | ●   |     |     |     | ●   |     |     |
| 3rd  | ●   |     | ●   |     |     |     |     |
| 4th  | ●   |     |     | ●   |     |     |     |
| 5th  | ●   | ●   |     |     |     |     |     |
| 6th  |     | ●   |     | ●   |     |     |     |
| 7th  |     | ●   | ●   |     |     |     |     |
| 8th  |     | ●   |     |     | ●   |     |     |
| Rev1 |     |     | ●   |     |     | ●   |     |
| Rev2 |     |     |     | ●   |     | ●   |     |

(●): INDICATES THAT ENGINE BRAKE IS APPLIED.

FIG. 5A

8th — VEHICLE SPEED

| | | 0-30 | 30-60 | 60-90 | 90-120 | 120- |
|---|---|---|---|---|---|---|
| DOWNHILL ROAD | GRADIENT | 2 | 2 | 2 | 2 | 1 |
| LEVEL ROAD | | 1 | 1 | 1 | 1 | 1 |
| | | 2 | 2 | 2 | 2 | 1 |
| UPHILL ROAD | | 3 | 3 | 3 | 2 | 1 |

FIG. 5B

7th — VEHICLE SPEED

| | | 0-30 | 30-60 | 60-90 | 90-120 | 120- |
|---|---|---|---|---|---|---|
| DOWNHILL ROAD | GRADIENT | 2 | 2 | 2 | 2 | 1 |
| LEVEL ROAD | | 1 | 1 | 1 | 1 | 1 |
| | | 2 | 2 | 2 | 2 | 1 |
| UPHILL ROAD | | 3 | 3 | 2 | 2 | 1 |

FIG. 5C

6th — VEHICLE SPEED

| | | 0-30 | 30-60 | 60-90 | 90-120 | 120- |
|---|---|---|---|---|---|---|
| DOWNHILL ROAD | GRADIENT | 2 | 2 | 2 | 2 | 1 |
| LEVEL ROAD | | 1 | 1 | 1 | 1 | 1 |
| | | 2 | 2 | 2 | 1 | 1 |
| UPHILL ROAD | | 3 | 3 | 2 | 2 | 1 |

FIG. 5D

5th — VEHICLE SPEED

| | | 0-30 | 30-60 | 60-90 | 90-120 | 120- |
|---|---|---|---|---|---|---|
| DOWNHILL ROAD | GRADIENT | 2 | 2 | 2 | 2 | 1 |
| LEVEL ROAD | | 1 | 1 | 1 | 1 | 1 |
| | | 2 | 2 | 1 | 1 | 1 |
| UPHILL ROAD | | 3 | 2 | 2 | 1 | 1 |

FIG. 5E

4th — VEHICLE SPEED

| | | 0-30 | 30-60 | 60-90 | 90-120 | 120- |
|---|---|---|---|---|---|---|
| DOWNHILL ROAD | GRADIENT | 2 | 2 | 1 | 1 | 1 |
| LEVEL ROAD | | 1 | 1 | 1 | 1 | 1 |
| | | 2 | 1 | 1 | 1 | 1 |
| UPHILL ROAD | | 2 | 2 | 1 | 1 | 1 |

VEHICLE SPEED ↔

| | | 0-30 | 30-60 | 60-90 | 90-120 | 120- |
|---|---|---|---|---|---|---|
| SMALL | STEERING ANGLE ↕ | 1 | 1 | 1 | 1 | 1 |
| | | 2 | 2 | 2 | 2 | 1 |
| | | 3 | 3 | 2 | 2 | 1 |
| LARGE | | 2 | 2 | 1 | 1 | 1 |

VEHICLE SPEED ↔

| | | 0-30 | 30-60 | 60-90 | 90-120 | 120- |
|---|---|---|---|---|---|---|
| SMALL | STEERING ANGLE ↕ | 1 | 1 | 1 | 1 | 1 |
| | | 2 | 2 | 2 | 2 | 1 |
| | | 3 | 3 | 2 | 2 | 1 |
| LARGE | | 2 | 2 | 1 | 1 | 1 |

VEHICLE SPEED ↔

| | | 0-30 | 30-60 | 60-90 | 90-120 | 120- |
|---|---|---|---|---|---|---|
| SMALL | STEERING ANGLE ↕ | 1 | 1 | 1 | 1 | 1 |
| | | 2 | 2 | 2 | 1 | 1 |
| | | 3 | 2 | 2 | 2 | 1 |
| LARGE | | 2 | 2 | 1 | 1 | 1 |

VEHICLE SPEED ↔

| | | 0-30 | 30-60 | 60-90 | 90-120 | 120- |
|---|---|---|---|---|---|---|
| SMALL | STEERING ANGLE ↕ | 1 | 1 | 1 | 1 | 1 |
| | | 2 | 2 | 2 | 1 | 1 |
| | | 2 | 2 | 2 | 2 | 1 |
| LARGE | | 2 | 2 | 1 | 1 | 1 |

VEHICLE SPEED ↔

| | | 0-30 | 30-60 | 60-90 | 90-120 | 120- |
|---|---|---|---|---|---|---|
| SMALL | STEERING ANGLE ↕ | 1 | 1 | 1 | 1 | 1 |
| | | 2 | 1 | 1 | 1 | 1 |
| | | 2 | 2 | 1 | 1 | 1 |
| LARGE | | 1 | 1 | 1 | 1 | 1 |

CONTROL DEVICE FOR AUTOMATIC TRANSMISSION

INCORPORATION BY REFERENCE

The disclosure of Japanese Patent Application No. 2007-338148 filed on Dec. 27, 2007 including the specification, drawings and abstract is incorporated herein by reference in its entirety.

BACKGROUND

The present invention relates to a control device and method for an automatic transmission.

An automatic transmission mounted on a vehicle or the like is structured so as to be capable of driving the vehicle at an appropriate gear ratio without a shift operation by a driver, by automatically judging a gear ratio (shift speed) based on an accelerator opening and a vehicle speed particularly during forward driving. However, in recent years, in order to meet such a demand for sports driving and a delicate selection of engine braking for example, automatic transmissions have been proposed that also allow a so-called manual shift operation in which the driver can select a gear ratio (shift speed) (see, for example, Japanese Patent Application Publication No. JP-A-10-324169).

In recent years, since improvements in vehicle fuel consumption and so on are required, multi-speed automatic transmissions, such as those achieving six or more forward speeds, are becoming prevailing in the category of stepped automatic transmissions. Moreover, automatic transmissions such as belt type CVTs, that steplessly change speed, are also structured so as to be capable of selecting simulated shift speeds by providing finely spaced gear ratios (for example, 6 stages or more).

SUMMARY

However, in order to obtain a large engine brake force, for example, during downhill driving or hard braking with the automatic transmission provided with the finely spaced (multi-speed) gear ratios (shift speeds) such as described above, it is required to change the gear ratio (shift speed) through, for example, two or three stages. Particularly, in the case of performing the manual shift operation as described above, there has been a problem in that the driver needs to successively perform a manual shift operation a multiple number of times in a short period of time, resulting in a troublesome operation that is not preferable in terms of ease of operation of the vehicle.

Moreover, when performing the manual shift operation as described above, the trouble of the operation is expected to be eased by structuring the automatic transmission so that a command for multiple-speed shift is executed, for example, by a so-called long pressing operation in which a control lever or the like is kept to be pressed in the downshift command position. However, when taking into account the time for the long pressing required for judgment to prevent an erroneous operation from occurring, a long time is required for completing the shift command, resulting in a lack of responsiveness that is particularly unfavorable to sports driving. In addition, because the shift command is increased by one stage for each operation, the shifting of the automatic transmission is performed one stage at a time, that is, for example, in the sequence of 6th, 5th, 4th, and 3rd, resulting in the generation of successive speed shifts, and thus causing a problem that is not preferable in terms of driveability.

Therefore, it is an object of the present invention to provide a control device for an automatic transmission that is capable of quickly downshifting to a gear ratio desired by a driver without involving a troublesome operation when performing an operation based on a downshift command by using a manual operation device. The present invention can also achieve various other advantages.

An exemplary control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device includes a manual shift control unit that changes and sets the gear ratio after downshift depending on road conditions when the downshift command has been operated by the manual operation device in the manual shift mode, and performs the downshift to the gear ratio that has been changed and set.

An exemplary method of operating an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the method includes determining whether the downshift command has been operated by the manual operation device in the manual shift mode; changing and setting the gear ratio after downshift depending on road conditions when the downshift command has been operated by the manual operation device in the manual shift mode; and performing the downshift to the gear ratio that has been changed and set.

An exemplary automatic transmission system includes an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device; and a manual shift control unit that changes and sets a gear ratio after downshift depending on road conditions when the downshift command has been operated by the manual operation device in the manual shift mode, and performs the downshift to the gear ratio that has been changed and set.

BRIEF DESCRIPTION OF THE DRAWINGS

Various exemplary aspects of the invention will be described with reference to the drawings, wherein:

FIG. 2 is a skeleton view showing an automatic transmission to which the present invention can be applied;

FIG. 3 is an engagement table of the present automatic transmission;

FIGS. 5A to 5E are road gradient reflecting maps, FIG. 5A being a map used in eighth speed, FIG. 5B being a map used in seventh speed, FIG. 5C being a map used in sixth speed, FIG. 5D being a map used in fifth speed, and FIG. 5E is a map used in fourth speed;

FIGS. 8A to 8E are corner geometry reflecting maps, FIG. 8A being a map used in eighth speed, FIG. 8B being a map used in seventh speed, FIG. 8C being a map used in sixth speed, FIG. 8D being a map used in fifth speed, and FIG. 8E being a map used in fourth speed.

DETAILED DESCRIPTION OF EMBODIMENTS

Figure 1:
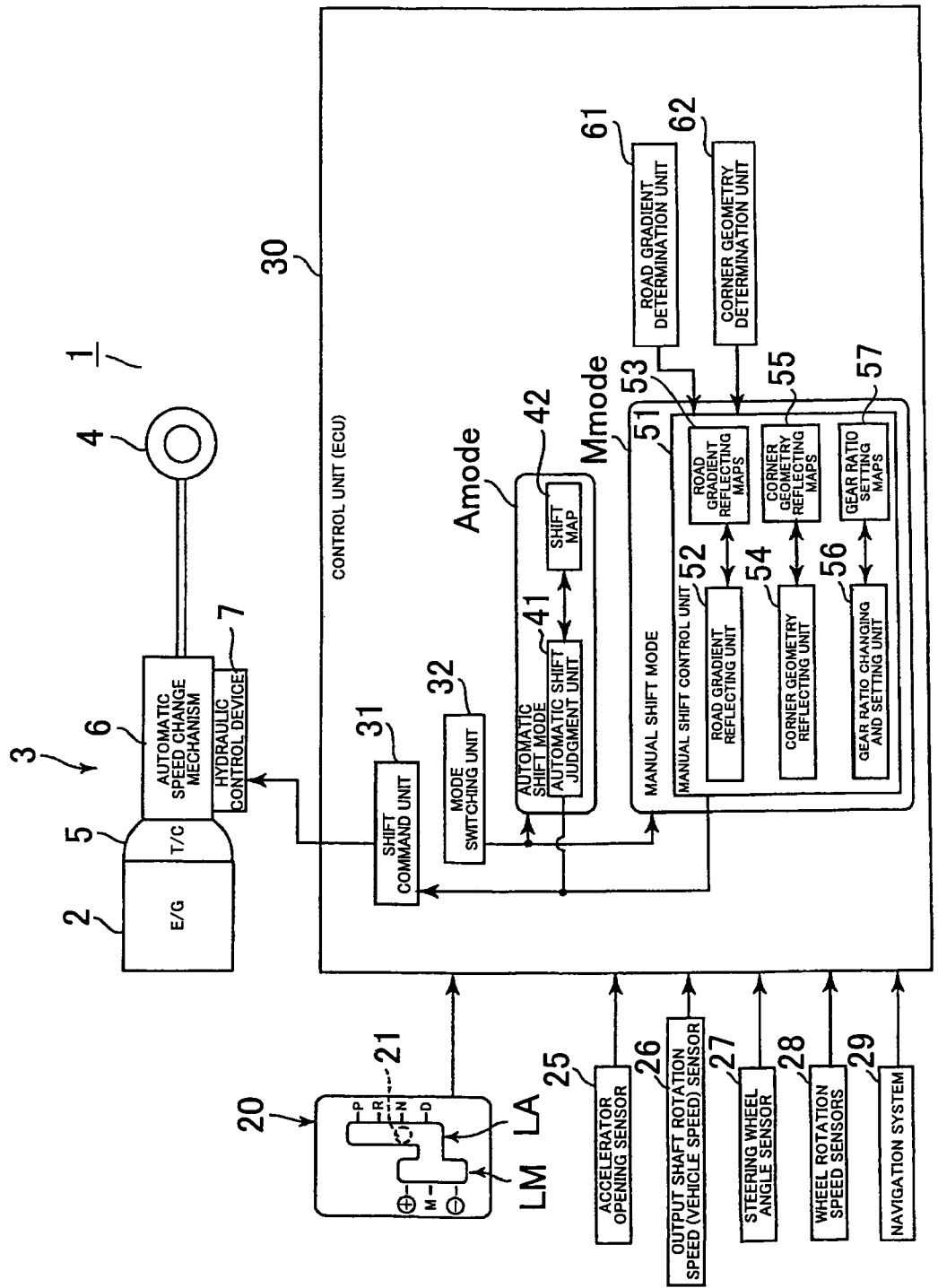
FIG. 1 is a block diagram showing a control device for an automatic transmission according to the present invention.

Hereinafter, an embodiment of the present invention will be described with reference to FIGS. 1 to 9. First, the schematic configuration of an automatic transmission 3 to which the present invention can be applied will be described mainly according to FIG. 2. As shown in FIG. 1, the automatic transmission 3 is provided so as to be interposed between an engine (E/G) 2 and driving wheels 4, and is structured so as to include, in a broad sense, a torque converter (T/C) 5, an automatic speed change mechanism (speed change gear mechanism) 6, and a hydraulic control device 7.

As shown in FIG. 2, the automatic transmission 3 that is suitable for use in, for example, an FF (front engine, front drive) type vehicle has an input shaft 8 that can be connected to the engine 2 (refer to FIG. 1). The torque converter 5 connected to the input shaft 8 has a pump impeller 5b operatively coupled with the input shaft 8, and a turbine runner 5c to which the rotation of the pump impeller 5b is transmitted through hydraulic fluid. The turbine runner 5c is connected to an input shaft 9 of the above-mentioned automatic speed change mechanism 6 that is arranged coaxially with the above-mentioned input shaft 8. In addition, the torque converter 5 is provided with a lockup clutch 5a. When the lockup clutch 5a is engaged by hydraulic control of the hydraulic control device 7 (refer to FIG. 1), the rotation of the input shaft 8 of the above-mentioned automatic transmission 3 is directly transmitted to the input shaft 9 of the automatic speed change mechanism 6.

The above-mentioned automatic speed change mechanism 6 is provided with a planetary gear DP and a planetary gear unit PU on the input shaft 9. The planetary gear DP is a so-called double-pinion planetary gear which is provided with a sun gear S1, a carrier CR1, and a ring gear R1, where the carrier CR1 has, in an intermeshing manner, a pinion P2 that meshes with the sun gear S1 and a pinion P1 that meshes with the ring gear R1.

In addition, the above-mentioned planetary gear unit PU is a so-called Ravigneaux type planetary gear which has a sun gear S2, a sun gear S3, a carrier CR2, and a ring gear R2, where the carrier CR2 has, in an intermeshing manner, a long pinion P3 that meshes with the sun gear S3 and the ring gear R2, and a short pinion P4 that meshes with the sun gear S2.

The sun gear S1 of the above-mentioned planetary gear DP is fixed as a unit to a case 16. In addition, the above-mentioned carrier CR1 is connected to the above-mentioned input shaft 9 so as to make the same rotation as the rotation of the input shaft 9 (hereinafter called "input rotation"), and also connected to a clutch C-4. Moreover, the above-mentioned ring gear R1 makes a decelerated rotation which is decelerated from the input rotation by the fixed sun gear S1 and the carrier CR1 making the input rotation, and is also connected to a clutch C-1 and a clutch C-3.

The sun gear S3 of the above-mentioned planetary gear unit PU can be fixed to the case 16 by being connected to a brake B-1, and is also connected to the above-mentioned clutch C-4 and clutch C-3 to be able to receive the input rotation from the above-mentioned carrier CR1 through the clutch C-4 and the decelerated rotation from the above-mentioned ring gear R1 through the clutch C-3. In addition, the above-mentioned sun gear S2 is connected to the clutch C-1 to be able to receive the decelerated rotation input from the above-mentioned ring gear R1.

Moreover, the above-mentioned carrier CR2 is connected to a clutch C-2 receiving the rotation input from the input shaft 9, to be able to receive the input rotation through the clutch C-2, and also connected to a one-way clutch F-1 and a brake B-2, to be restricted in rotation in one direction relative to the case 16 through the one-way clutch F-1 and to be able to be held stationary through the brake B-2. Furthermore, the above-mentioned ring gear R2 is connected to a counter gear 10 that is rotatably supported by, for example, an unshown center support member fixed to the case 16.

The counter gear 10 meshes with a large diameter gear 11 arranged in a fixed manner at one end of a counter shaft 12 of a counter shaft portion 17, and a small diameter gear 12a arranged in a fixed manner at the other end of the counter shaft 12 meshes with a gear 14 of a differential portion 18. The gear 14 is operatively coupled with a differential gear 13 and is connected to right and left axle shafts (output shafts) 15 and 15, so as to be capable of absorbing the differential rotation between the right and left axle shafts through the differential gear 13.

Subsequently, based on the structure described above, the operation of the automatic transmission 3 will be described according to FIGS. 2 and 3.

For example, at the first forward speed (1st) in the D (drive) range, the clutch C-1 and the one-way clutch F-1 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the rotation of the carrier CR2 is restricted to one direction (forward rotating direction); that is, the carrier CR2 is prevented from rotating in the reverse direction so as to be fixed. Then, the decelerated rotation input to the sun gear S2 is output to the ring gear R2 through the fixed carrier CR2, and thus the forward rotation as the first forward speed is output from the counter gear 10.

In addition, during engine braking (coasting), the above-described state of the first forward speed is maintained in the manner in which the brake B-2 is locked to fix the carrier CR2 so that the carrier CR2 is prevented from rotating forward. Moreover, because the carrier CR2 is prevented from rotating in the reverse direction and allowed to rotate forward by the one-way clutch F-1 at the first forward speed, the first forward speed can be achieved smoothly by automatic engagement of the one-way clutch F-1, in the case, for example, of a shift from a non-drive range to a drive range.

At the second forward speed (2nd), the clutch C-1 is engaged and the brake B-1 is locked, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the sun gear S3 is held stationary by the locking of the brake B-1. Then, the carrier CR2 makes a decelerated rotation slower than that of the sun gear S2, and the decelerated rotation input to the sun gear S2 is output to the ring gear R2 through the carrier CR2. Thus, the forward rotation as the second forward speed is output from the counter gear 10.

At the third forward speed (3rd), the clutch C-1 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the decelerated rotation of the ring gear R1 is input to the sun gear S3 by the engagement of the clutch C-3. That is, the decelerated rotation of the ring gear R1 is input to the sun gear S3 and the sun gear S2. Therefore, the planetary gear unit PU takes the state of direct connection of the decelerated rotation to output the decelerated rotation directly to the ring gear R2. Thus, the forward rotation as the third forward speed is output from the counter gear 10.

At the fourth forward speed (4th), the clutch C-1 and the clutch C-4 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the input rotation of the carrier CR1 is input to the sun gear S3 by the engagement of the clutch C-4. Then, the carrier CR2 makes a decelerated rotation faster than that of the sun gear S2, and the decelerated rotation input to the sun gear S2 is output to the ring gear R2 through the carrier CR2. Thus, the forward rotation as the fourth forward speed is output from the counter gear 10.

At the fifth forward speed (5th), the clutch C-1 and the clutch C-2 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S2 through the clutch C-1. In addition, the input rotation is input to the carrier CR2 by the engagement of the clutch C-2. Then, a decelerated rotation faster than that of the above-described fourth forward speed is produced by the decelerated rotation input to the sun gear S2 and the input rotation input to the carrier CR2, and is output to the ring gear R2. Thus, the forward rotation as the fifth forward speed is output from the counter gear 10.

At the sixth forward speed (6th), the clutch C-2 and the clutch C-4 are engaged, as shown in FIG. 3. Then, as shown in FIG. 2, the input rotation of the carrier CR1 is input to the sun gear S3 by the engagement of the clutch C-4. In addition, the input rotation is input to the carrier CR2 by the engagement of the clutch C-2. That is, the input rotation is input to the sun gear S3 and the carrier CR2. Therefore, the planetary gear unit PU takes the state of direct connection of the input rotation to output the input rotation directly to the ring gear R2. Thus, the forward rotation as the sixth forward speed is output from the counter gear 10.

At the seventh forward speed (7th), the clutch C-2 and the clutch C-3 are engaged, as shown in FIG. 3. Then, as shown in FIG. 2, the rotation of the ring gear R1 which makes the decelerated rotation provided by the fixed sun gear S1 and the carrier CR1 making the input rotation is input to the sun gear S3 through the clutch C-3. In addition, the input rotation is input to the carrier CR2 by the engagement of the clutch C-2. Then, an accelerated rotation slightly faster than that of the input rotation is produced by the decelerated rotation input to the sun gear S3 and the input rotation input to the carrier CR2, and is output to the ring gear R2. Thus, the forward rotation as the seventh forward speed is output from the counter gear 10.

At the eighth forward speed (8th), the clutch C-2 is engaged and the brake B-1 is locked, as shown in FIG. 3. Then, as shown in FIG. 2, the input rotation is input to the carrier CR2 by the engagement of the clutch C-2. In addition, the sun gear S3 is held stationary by the locking of the brake B-1. Then, the input rotation of the carrier CR2 is made to be an accelerated rotation faster than that of the above-described seventh forward speed by the sun gear S3 held stationary, and is output to the ring gear R2. Thus, the forward rotation as the eighth forward speed is output from the counter gear 10.

At the first reverse speed (Rev1), the clutch C-3 is engaged and the brake B-2 is locked, as shown in FIG. 3. Then, as shown in FIG. 2, the rotation of the ring gear R1 which makes the decelerated rotation provided by the fixed sun gear S1 and the carrier CR1 making the input rotation is input to the sun gear S3 through the clutch C-3. In addition, the carrier CR2 is held stationary by the locking of the brake B-2. Then, the decelerated rotation input to the sun gear S3 is output to the ring gear R2 through the carrier CR2 held stationary, and thus the reverse rotation as the first reverse speed is output from the counter gear 10.

At the second reverse speed (Rev2), the clutch C-4 is engaged and the brake B-2 is locked, as shown in FIG. 3. Then, as shown in FIG. 2, the input rotation of the carrier CR1 is input to the sun gear S3 by the engagement of the clutch C-4. In addition, the carrier CR2 is held stationary by the locking of the brake B-2. Then, the input rotation input to the sun gear S3 is output to the ring gear R2 through the carrier CR2 held stationary, and thus the reverse rotation as the second reverse speed is output from the counter gear 10.

Note that, for example, in the P (parking) range and in the N (neutral) range, the clutches C-1, C-2, C-3, and C-4 are disengaged. Then, disconnection occurs between the carrier CR1 and the sun gear S3, between the ring gear R1 and the sun gear S3, and between the ring gear R1 and the sun gear S2, that is, between the planetary gear DP and the planetary gear unit PU. Also, the input shaft 9 and the carrier CR2 are disconnected from each other. As a result, power transmission is disconnected between the input shaft 9 and the planetary gear unit PU, that is, between the input shaft 9 and the counter gear 10.

Then, the rotation that has been output to the counter gear 10 at a speed of one of the first to eighth forward speeds, and first and second reverse speeds described above is further decelerated by the large diameter gear 11 and the small diameter gear 12a of the counter shaft 12, and is also output to the right and left axle shafts 15 and 15 through the differential gear 13 absorbing the differential rotation between the right and left axle shafts, thus being transmitted to the driving wheels 4.

Subsequently, a control device 1 for the automatic transmission 3 according to the present invention will be described according to FIGS. 1, and 4 to 9. As should be appreciated, the control device 1 and the automatic transmission 3 form an automatic transmission system.

As shown in FIG. 1, the control device 1 for the present automatic transmission has a control unit (ECU) 30, to which sensors (not shown) of a shift lever unit 20, an accelerator opening sensor 25, an output shaft rotation speed (vehicle speed) sensor 26, a steering wheel angle sensor 27, wheel rotation speed sensors 28, a navigation system 29 in the case of a vehicle equipped with the navigation system 29, and others are connected. The control unit 30 is also connected to solenoid valves (not shown) of the hydraulic control device 7 for the automatic transmission 3.

The control unit 30 is provided with a shift command unit 31 and a mode switching unit 32, and also provided with an automatic shift judgment unit 41 and a shift map 42 for executing an automatic shift mode Amode, as well as a manual shift control unit 51, a road gradient determination unit 61, and a corner geometry determination unit 62 for performing a manual shift mode Mmode. The manual shift control unit 51 is structured to include a road gradient reflecting unit 52 and road gradient reflecting maps 53; a corner geometry reflecting unit 54 and corner geometry reflecting maps 55; and a gear ratio changing and setting unit 56 and gear ratio setting maps 57.

The shift lever unit 20 mentioned above is located in the vicinity of a driver's seat, and structured so that the driver can operate a shift lever (a manual operation device) 21 sketchily indicated by a dashed line in the diagram to select the shift lever position. The present shift lever unit 20 is structured so as to be arranged with a range selection lane LA used only for selecting a shift range for use as an automatic transmission, and a manual shift lane LM used by the driver for manually indicating a shift speed. That is, in the range selection lane LA, manipulating the position of the shift lever 21 can select any of position "P" (parking range position), position "R" (reverse range position), position "N" (neutral range position), and position "D" (drive range position), as is commonly known. In addition, the shift lever 21 can be moved from position "D" to the manual shift lane LM, in which the shift lever 21 can be operated to select position "M" (fixed shift position), position "+" (upshift position), or position "−" (downshift position). Each of the positions of the shift lever 21 mentioned above is detected by each sensor (not shown) located in each position, and output to the control unit 30. Note that the shift lever 21 is urged, for example, by a spring, toward position "M" from position "+" or position "−" so as to be automatically returned to position "M" after being operated by the driver.

Note that, in the present embodiment, examples in which the manual shift command is issued by using the shift lever will be described. However, not limited to this case, any device may be used if it can issue the manual shift command. For example, a combination of a button for upshift and a button for downshift provided on a steering wheel, or a combination of a paddle for upshift and a paddle for downshift on the back face of the steering wheel may be used.

In addition, in the description below, examples will be explained in which the shift speed is fixed when the shift position is at "M", as the present embodiment. However, not limited to this case, when the shift position is at "M", the automatic shift may be performed between upper limit shift speeds that have been determined by an upshift command and a downshift command.

In the above-mentioned shift lever unit 20, when the shift lever 21 has been operated to select position "D", the above-mentioned mode switching unit 32 selects the automatic shift mode Amode (switches the mode from the manual shift mode Mmode to the automatic shift mode Amode if the position has been moved from position "M" to position "D"), and in response, the automatic shift judgment unit 41 performs the automatic shift referring to the shift map 42 based on the accelerator opening TH detected by the accelerator opening sensor 25 and on the vehicle speed V detected by the output shaft rotation speed sensor 26. That is, upshift lines and downshift lines (shift points) corresponding to the accelerator opening TH and the vehicle speed V are recorded on the shift map 42. When the accelerator opening TH and the vehicle speed V at the time cross over those shift lines, the automatic shift judgment unit 41 judges to shift speeds. Then, in response to the judgment made by the automatic shift judgment unit 41 to shift speeds, the shift command unit 31 controls the solenoid valve (not shown) of the hydraulic control device 7 by electric command so as to achieve the judged shift speed, thus bringing the automatic transmission 3 into the state of the judged shift speed.

In the above-mentioned shift lever unit 20, when the shift lever 21 has been operated (switched) to change selection from position "D" to position "M", the above-mentioned mode switching unit 32 selects the manual shift mode Mmode (switches the mode from the automatic shift mode Amode to the manual shift mode Mmode). Then, except in the case, to be described later in detail, of a downshift reflecting a road gradient or corner geometry, or of a downshift set by the gear ratio changing and setting unit 56, the manual shift control unit 51 judges to downshift by one stage every time a downshift command is issued by one operation of the shift lever 21 into position "−", and conversely judges to upshift by one stage every time an upshift command is issued by one operation of the shift lever 21 into position "+". When the manual shift control unit 51 has judged to upshift or downshift as described above, the shift command unit 31 controls the solenoid valve (not shown) of the hydraulic control device 7 by electric command so as to achieve the judged shift speed, thus bringing the automatic transmission 3 into the state of the judged shift speed, in the same manner as described above.

However, based on the accelerator opening TH and the vehicle speed V, if there is a problem about the shift speed to be shifted to, that is, if the shifting is concerned to cause the engine to be over-revved or stalled, the manual shift control unit 51 cancels the shift operation of the shift lever 21 conducted by the driver with, for example, a warning sound for notification at the driver's seat. In addition, as a matter of course, the manual shift control unit 51 cancels an upshift from the above-mentioned eighth forward speed (highest shift speed) and a downshift from the above-mentioned first forward speed (lowest shift speed). Moreover, if it is unfavorable to keep the shift speed unchanged because, for example, the engine may be stalled by a drop of the vehicle speed V without a shift operation of the shift lever 21 by the driver. The manual shift control unit 51 forces shifting to a shift speed that achieves a favorable state, with, for example, a warning sound for notification at the driver's seat.

Subsequently, a description will be made of the manual downshift that takes the road conditions into account. Note that, for ease of understanding of the present invention, the present embodiment is divided into the following four embodiments to be described later in detail: control based on road gradient; control of correction based on road gradient; control based on corner geometry; and control of correction based on corner geometry. These embodiments will be described in detail as first to fourth embodiments.

First Embodiment

Figure 4:
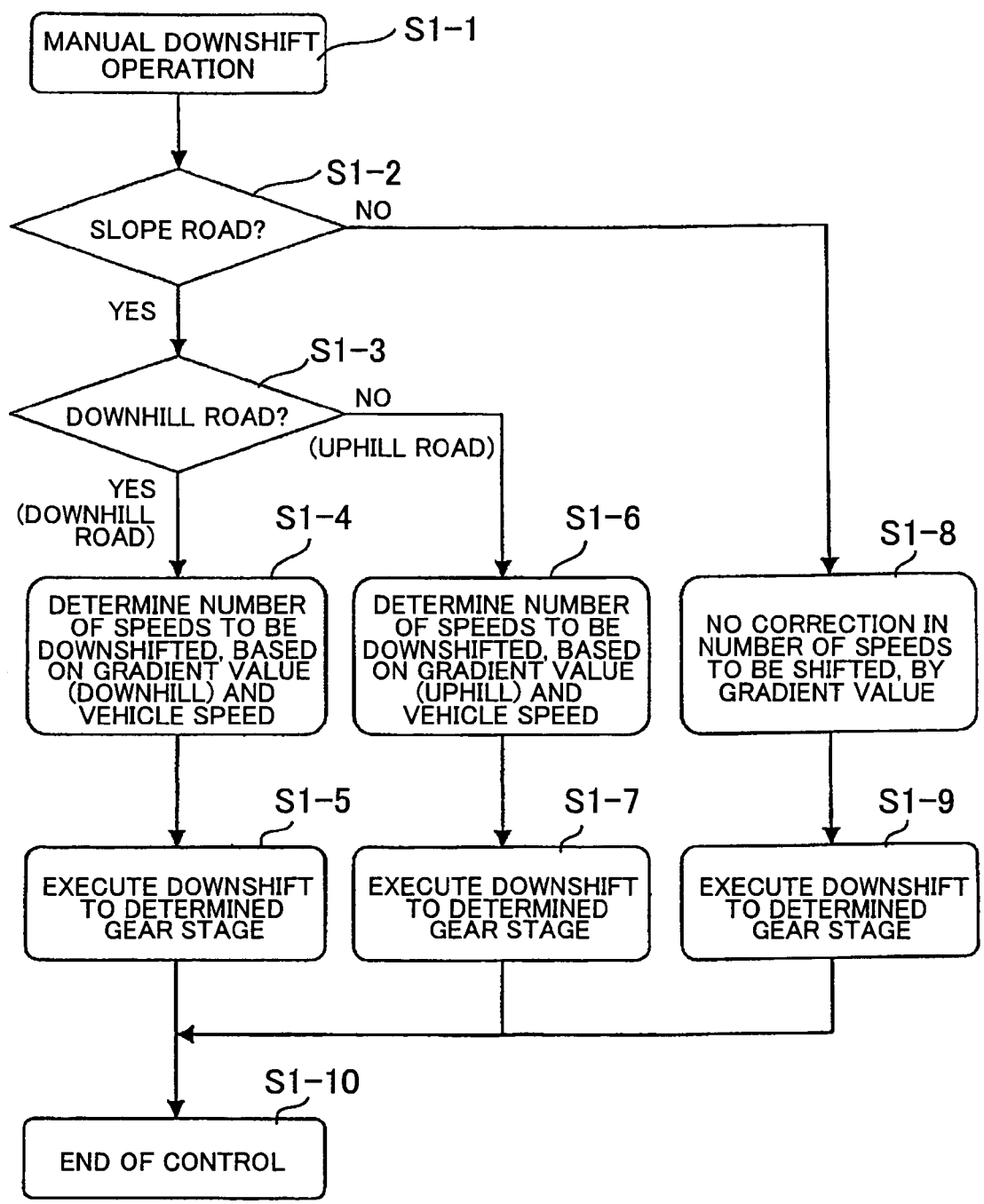
FIG. 4 is a flowchart showing manual downshift control that reflects a road gradient.

First, a description will be made of a first embodiment that takes into account the road gradient serving as a road condition, according to FIGS. 4 and 5, with reference to FIG. 1.

For example, in the state in which an ignition switch is turned on (at least in the state of the manual shift mode Mmode), the road gradient determination unit 61 calculates the running resistance of the vehicle as needed, based on the accelerator opening TH detected by the accelerator opening sensor 25 and on the vehicle speed V detected by the output shaft rotation speed (vehicle speed) sensor 26, and based on the running resistance, determines the gradient value of the road on which the vehicle is currently running as needed. Note that the road gradient determination unit 61 may determine the road gradient, for example, based on the road information from a navigation system 29 in the case of a vehicle equipped with the navigation system 29, or may determine the road gradient, for example, by using a vehicle inclination sensor, or furthermore may determine the road gradient more accurately by combining these methods.

This control is started when the driver has operated the shift lever 21 from position "D" to position "M". For example, if the shift lever 21 is operated from position "M" to position "−" while the vehicle is running on the level road, and a downshift command as a manual shift (hereinafter called "manual downshift") is input to the control unit 30 (S1-1), the road gradient reflecting unit 52 first determines whether the road is a slope road or not based on the determination result of the above-mentioned road gradient determination unit 61 (S1-2), and because the road in this case is not a slope road (because it is a level road) (No in S1-2), the road gradient reflecting unit 52 does not correct the number of speeds to be shifted based on the gradient value of the road, that is, determines to downshift by one stage as a normal manual downshift operation (S1-8). Then, the road gradient reflecting unit 52 performs the downshift to the gear stage determined, that is, the downshift to the shift speed on the lower speed side of the shift speed before downshift by one stage (S1-9), and finishes the control (S1-10).

That is, in the case that the driver has performed the manual downshift operation on the level road as described above, the downshift is performed by one stage in response to one issuance of the downshift command in the same manner as a general automatic transmission, on the judgment that the situation is neither particularly driving on an uphill road where a large driving force is required nor particularly driving on a downhill road where a large engine braking force is required.

Note that, in the step S1-8 described above, the same result of the manual downshift is also obtained if the numbers of speeds to be shifted for a level road are preliminarily recorded in the road gradient reflecting maps 53, for example, as shown in FIGS. 5A to 5E, and then the road gradient reflecting unit 52 determines the number of shift speed difference between before and after downshift by referring to the road gradient reflecting maps 53.

On the other hand, if, for example, the manual downshift operation is performed while the vehicle is running on the downhill road (S1-1), the road gradient reflecting unit 52 determines whether the road is a slope road or not based on the determination result of the above-mentioned road gradient determination unit 61 (S1-2), and because the road is a slope road (Yes in S1-2), determines whether the road is a downhill road or not (S1-3). Then, because the road is a downhill road (Yes in S1-3), the process proceeds to step S1-4.

Then, the road gradient reflecting unit 52 refers to the road gradient reflecting maps 53 shown in FIGS. 5A to 5E, based on the determination result of the above-mentioned road gradient determination unit 61, that is, based on the gradient value of the downhill and the vehicle speed V. That is, the road gradient reflecting unit 52 refers to the map shown in FIG. 5A if the current shift speed (before downshift) is the eighth forward speed; the map shown in FIG. 5B if the current shift speed is the seventh forward speed; the map shown in FIG. 5C if the current shift speed is the sixth forward speed; the map shown in FIG. 5D if the current shift speed is the fifth forward speed; or the map shown in FIG. 5E if the current shift speed is the fourth forward speed. Note that, if the current shift speed is the third or lower forward speed, a downshift by two or more stages is unnecessary when considering the difference in gear ratio, and also a downshift by two or more stages is impossible from the second forward speed, as a matter of course. Therefore, maps for the first to third forward speeds are unnecessary as the road gradient reflecting maps 53.

The road gradient reflecting maps 53 shown in FIGS. 5A to 5E mentioned above are structured so that the number of shift speeds by which one downshift is achieved increases as the vehicle speed V [km/h] becomes lower, and also so that the number of shift speeds by which one downshift is achieved increases as the gradient value increases on both the uphill and downhill roads. Moreover, the road gradient reflecting maps 53 are structured so that the number of shift speeds by which one downshift is achieved increases as the shift speed before downshift is higher.

Then, the road gradient reflecting unit 52 determines (changes and sets) the number of speeds to be downshifted for the downhill road by referring to the thus structured road gradient reflecting maps 53 (S1-4), then performs the downshift to the determined shift speed (gear stage) by issuing the command to the shift command unit 31 described above (S1-5), and finishes the control (S1-10).

Moreover, if, for example, the manual downshift operation is performed while the vehicle is running on the uphill road (S1-1), the road gradient reflecting unit 52 similarly determines whether the road is a downhill road or not (S1-3) because the road is a slope road (Yes in S1-2) based on the determination result of the above-mentioned road gradient determination unit 61, and because the road is not a downhill road (it is an uphill road) (No in S1-3), the process proceeds to step S1-6.

In the step S1-6, the road gradient reflecting unit 52 determines (changes and sets) the number of speeds to be downshifted for the uphill road by referring to the above-described road gradient reflecting maps 53 in the similar manner. In this case, two levels of data depending on the gradient value are recorded for the uphill road in the road gradient reflecting maps 53, and the number of speeds to be shifted is determined and decided depending on the gradient value. Thus, by determining the number of speeds to be shifted depending on the gradient value, the manual downshift can be performed more finely corresponding to the driver's requirement. Then, the road gradient reflecting unit 52 performs the downshift to the determined shift speed (gear stage) by commanding the shift command unit 31 described above for the downshift by the determined number of speeds to be shifted (S1-7), and finishes the control (S1-10). Note that, in the road gradient reflecting maps 53 of the present embodiment, the data of one level are exemplified as recorded data for the downhill road. However, not limited to these examples, the data may be prepared as segmented data based on the gradient value for the downhill and uphill roads, and accordingly, the road gradient reflecting maps 53 may be structured so as to enable the manual downshift more finely corresponding to the driver's requirement.

Then, if the driver operates the shift lever 21 from position "M" to position "D", the control described above is terminated, and the mode is changed to the automatic shift mode Amode by the mode switching unit 32 described above, that is, the control for automatic shift is started.

Note that the present embodiment has been described in the case that the road gradient determination unit 61 calculates and determines the gradient value of the road on a full-time basis during driving. However, not limited to this case, the gradient value may be calculated at the time when the manual downshift command is issued. That is, in the case that the gradient value is calculated on a full-time basis, the above-described road gradient reflecting maps are referred to by using the gradient value at the time of the issuance of the manual downshift command. Whereas in the case that the gradient value is calculated at the time of the issuance of the manual downshift command, the above-described road gradient reflecting maps are referred to by using the calculated gradient value.

In addition, the present embodiment has been described in the case that the road gradient determination unit 61 determines the gradient value of the road at the location where the current vehicle is running. However, not limited to this case, when calculating the gradient value of the road, the gradient value of the road at a predetermined distance forward of the vehicle may be calculated by using, for example, the road information from the navigation system 29.

According to the first embodiment as described above, the road gradient reflecting unit 52 of the manual shift control unit 51 changes and sets the shift speed after downshift depending on the road condition when the downshift command has been operated by the shift lever 21 in the manual shift mode Mmode, and performs the downshift to the shift speed that has been changed and set. Therefore, the downshift depending on the road condition can be achieved by performing only one operation of the shift lever 21 for issuing the downshift command. Thus the downshift to the gear ratio desired by the driver can be accomplished quickly without involving a troublesome operation.

In addition, because the road gradient reflecting unit 52 changes and sets the shift speed after downshift so that the number of shift speed difference between before and after downshift is made larger depending on the road gradient, the shift speed can be appropriately reflected in the manual downshift so as to be a shift speed corresponding to the road gradient, in the case, for example, that the driver requires a driving force on an uphill road or an engine braking force on a downhill road.

Specifically, because the road gradient reflecting unit 52 changes and sets the shift speed after downshift so that the number of shift speed difference (that is, gear ratio width) between before and after downshift is made larger as the road gradient becomes larger, the downshift can be performed so that the driving force increases on the uphill road relative to that on a level road, or so that the engine braking force increases on the downhill road relative to that on the level road, thus quickly achieving the downshift to the shift speed desired by the driver.

Moreover, because there are provided the road gradient reflecting maps 53 each of which, for each shift speed before downshift, preliminarily stores the shift speeds after downshift corresponding to the road gradient and the vehicle speed V, a complex calculation can be made unnecessary during manual downshifting, thus enabling a quick downshift depending on the road gradient. Furthermore, because the vehicle speed V can be reflected in the shift speed after downshift, a required amount of the driving force or the engine braking force can be appropriately generated depending on the vehicle speed V. Thus, not only driveability can be improved, but also driving stability can be ensured when performing the manual downshift.

Second Embodiment

Figure 6:
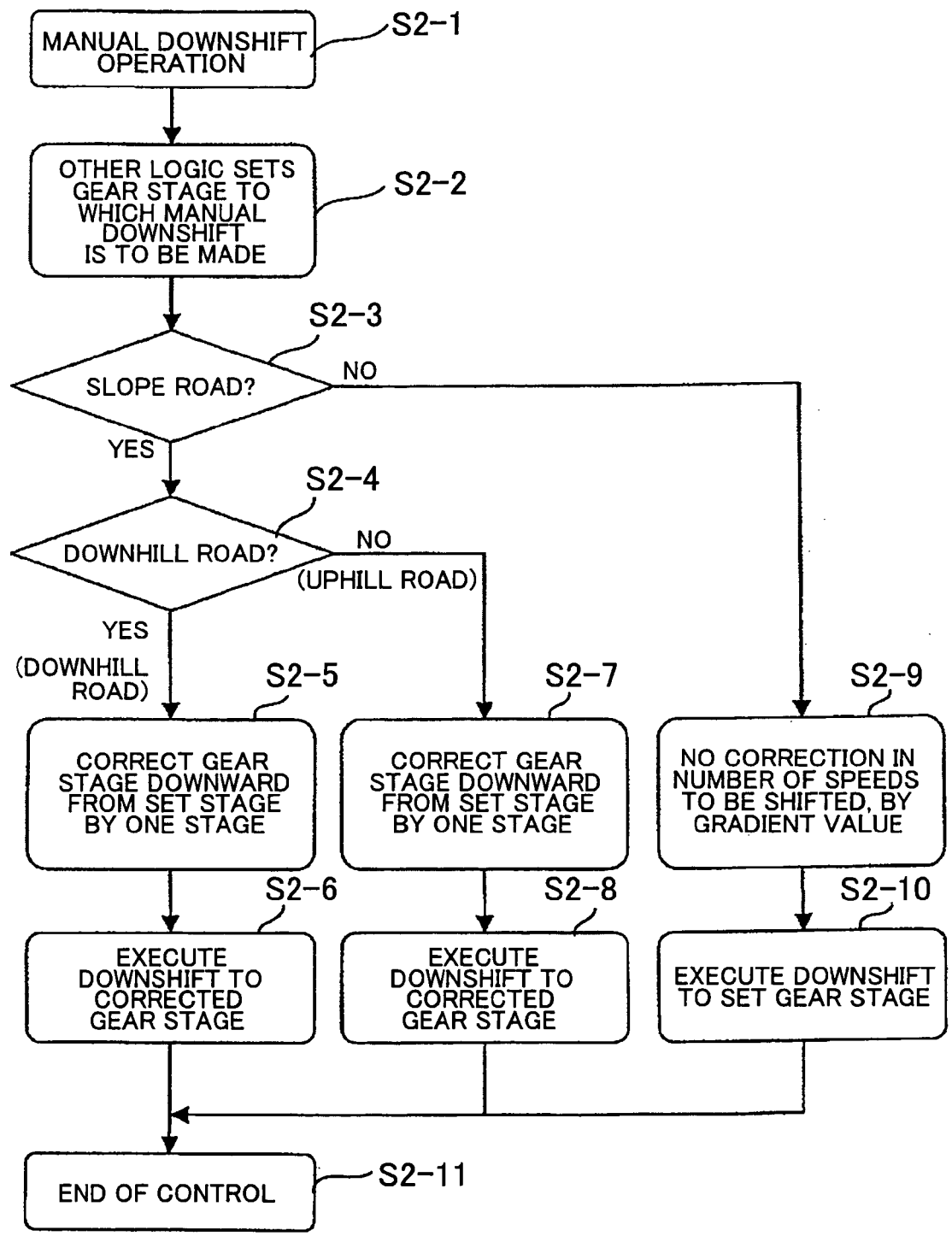
FIG. 6 is a flowchart showing manual downshift control for correcting a shift speed depending on the road gradient.

Next, description will be made of a second embodiment that takes into account the road gradient by correcting the shift speed after downshift based on the road gradient serving as a road condition, according to FIG. 6, with reference to FIG. 1.

In the same way as the first embodiment described above, for example, when the driver has operated the shift lever 21 from position "D" to position "M", control according to the second embodiment is started. For example, if the manual downshift operation is performed while the vehicle is running on the level road (S2-1), the gear ratio changing and setting unit 56 first sets the shift speed (gear stage) to which the manual downshift is to be made, according to another logic that is different from the determination of shift speed based on the road gradient described in the above-described first embodiment, by, for example, referring to the gear ratio setting maps 57 (S2-2).

Note that the another logic can be a logic, for example, in which the shift speed to which the manual downshift is to be made is set depending on the driver's degree of intention to decelerate (accelerator release speed, shift operation timing, deceleration of vehicle, etc.), in which the shift speed to which the manual downshift is to be made is set depending on the corner geometry to be described later, in which the shift speed to which the manual downshift is to be made is set depending on the type of the driver (sporty, normal, or economical), or in which the shift speed to which the manual downshift is to be made is set according to a fixed number of speeds to be shifted where some of the speeds are jumped over (skipped). In addition, the gear ratio setting maps 57 are composed of the maps (for example, the maps shown in FIGS. 5A to 5E described above) that record the shift speeds after downshift corresponding to the logics described above.

After the shift speed after downshift has been set by the gear ratio changing and setting unit 56 according to the another logic as described above, the road gradient reflecting unit 52 determines whether the road is a slope road or not based on the determination result of the above-mentioned road gradient determination unit 61 (S2-3), and because the road in this case is not a slope road (because it is a level road) (No in S2-3), the road gradient reflecting unit 52 does not correct the number of speeds to be shifted based on the gradient value of the road (S2-9). Then, the road gradient reflecting unit 52 performs the downshift to the gear stage determined in the above-described step S2-2 (S2-10), and finishes the control (S2-11).

That is, in the case that the driver has performed the manual downshift operation on the level road as described above, the manual downshift is performed to the shift speed changed and set by the another logic, on the judgment that the situation is neither particularly driving on an uphill road where a large driving force is required nor particularly driving on a downhill road where a large engine braking force is required.

On the other hand, if, for example, the manual downshift operation is performed while the vehicle is running on the downhill road (S2-1), the road gradient reflecting unit 52 determines whether the road is a slope road or not based on the determination result of the above-mentioned road gradient determination unit 61. (S2-3) after the gear ratio changing and setting unit 56 has set the shift speed to which the manual downshift is to be made according to the another logic as described above (S2-2), and because the road is a slope road (Yes in S2-3), determines whether the road is a downhill road or not (S2-4). Then, because the road is a downhill road (Yes in S2-4), the process proceeds to step S2-5.

Then, based on the determination that the road is a downhill road (that is, based on the road gradient), the road gradient reflecting unit 52 corrects the shift speed after downshift so as to be a shift speed lower by one stage than the shift speed set by the gear ratio changing and setting unit 56 in the step S2-2 described above (S2-5), and performs the downshift to the corrected shift speed after downshift by issuing the command to the shift command unit 31 described above (S2-6), and finishes the control (S2-11).

Moreover, if, for example, the manual downshift operation is performed while the vehicle is running on the uphill road (S2-1), the road gradient reflecting unit 52 similarly determines whether the road is a slope road or not based on the determination result of the above-mentioned road gradient determination unit 61 (S2-3) after the gear ratio changing and setting unit 56 has set the shift speed to which the manual downshift is to be made according to the another logic (S2-2), and because the road is a slope road (Yes in S2-3), determines whether the road is a downhill road or not (S2-4). Then, because the road is not a downhill road (it is an uphill road) (No in S2-4), the process proceeds to step S2-7.

Then, based on the determination that the road is an uphill road (that is, based on the road gradient), the road gradient reflecting unit 52 similarly corrects the shift speed after downshift so as to be a shift speed lower by one stage than the shift speed set by the gear ratio changing and setting unit 56 in the step S2-2 described above (S2-7), and performs the downshift to the corrected shift speed after downshift by issuing the command to the shift command unit 31 described above (S2-8), and finishes the control (S2-11). Note that, if the driver operates the shift lever 21 from position "M" to position "D", the control described above is terminated.

Also in the second embodiment as described above, the road gradient reflecting unit 52 of the manual shift control unit 51 changes and sets the shift speed after downshift depending on the road condition when the downshift command has been operated by the shift lever 21 in the manual shift mode Mmode, and performs the downshift to the shift speed that has been changed and set. Therefore, the downshift depending on the road condition can be achieved by performing only one operation of the shift lever 21 for issuing the downshift command, and thus the downshift to the gear ratio desired by the driver can be accomplished quickly without involving a troublesome operation.

Specifically, because the road gradient reflecting unit 52 changes and sets the shift speed after downshift by correcting, depending on the road gradient (downhill road or uphill road), the shift speed after downshift that has been set by the gear ratio changing and setting unit 56, the gear ratio after downshift set by the gear ratio changing and setting unit 56 depending, for example, on the driver's degree of intention to decelerate or on the type of the driver can be made to be a downshifted gear ratio that further takes the road gradient into account. That is, the downshift to the gear ratio desired by the driver can be appropriately achieved.

Third Embodiment

Figure 7:
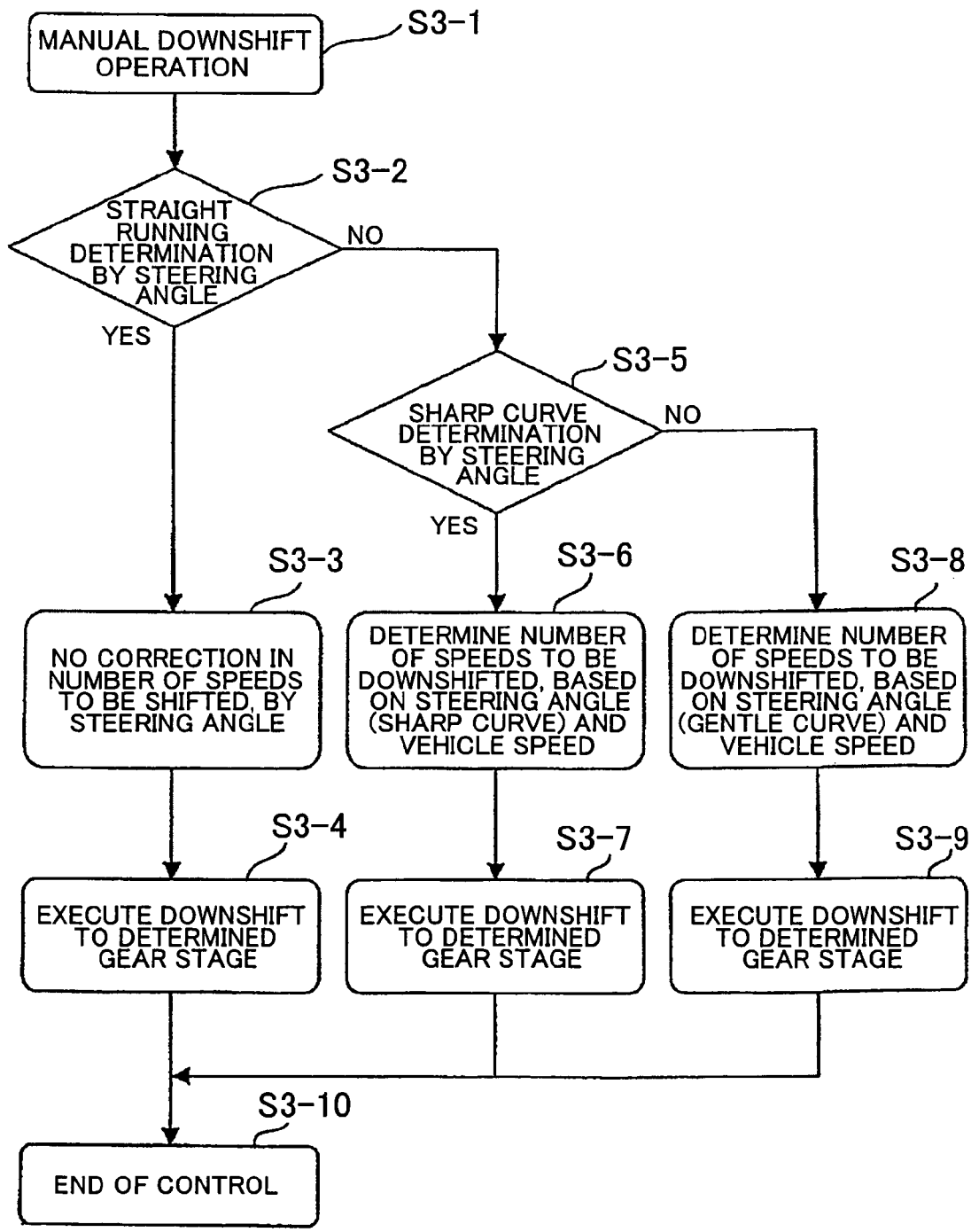
FIG. 7 is a flowchart showing manual downshift control that reflects corner geometry.

Next, description will be made of a third embodiment that takes into account the corner geometry serving as a road condition, according to FIGS. 7 and 8, with reference to FIG. 1.

For example, in the state in which an ignition switch is turned on (at least in the state of the manual shift mode Mmode), the corner geometry determination unit 62 determines the steering angle (that is, the corner geometry of the road on which the vehicle is currently running) as needed, based on the rotation angle of the steering wheel (not shown) detected by the steering wheel angle sensor 27. Note that the corner geometry determination unit 62 may determine the steering angle (that is, the corner geometry) by detecting the respective rotation speeds of the front, rear, right, and left wheels with the wheel rotation speed sensors 28, and then based on the difference among those rotation speeds (particularly, the difference in rotation speed between the front right wheel and the rear left wheel, or the difference in rotation speed between the front left wheel and the rear right wheel). Furthermore, the corner geometry determination unit 62 may determine the steering angle based on the corner geometry for example, according to the road information from the navigation system 29 in the case of a vehicle equipped with the navigation system 29, or may determine the steering angle more accurately by combining the information with the above-described steering wheel angle or the difference in the wheel rotation speeds.

In the same way as the first and second embodiments described above, for example, when the driver has operated the shift lever 21 from position "D" to position "M", control according to the third embodiment is started. For example, if the manual downshift operation is performed while the vehicle is running on the straight road (S3-1), the corner geometry reflecting unit 54 first determines whether the vehicle is running straight or not based on the steering angle determined by the corner geometry determination unit 62 described above (S3-2), and because the road in this case is a straight road (Yes in S3-2), the corner geometry reflecting unit 54 does not correct the number of speeds to be shifted based on the steering angle, that is, determines to downshift by one stage as a normal manual downshift operation (S3-3). Then, the corner geometry reflecting unit 54 performs the downshift to the determined gear stage, that is, the downshift to the shift speed on the lower speed side of the shift speed before downshift by one stage (S3-4), and finishes the control (S3-10).

That is, in the case that the driver has performed the manual downshift operation on the straight road as described above, the downshift is performed by one stage in response to one issuance of the downshift command in the same manner as a general automatic transmission, on the judgment that the situation is, neither, for example, entering a corner where deceleration is required nor, for example, driving on a road with successive corners in a mountain area where deceleration or a large driving force is required.

Note that, in the step S3-3 described above, the same result of the manual downshift is also obtained if the numbers of speeds to be shifted for straight road (in the case of small steering angle) are preliminarily recorded in the corner geometry reflecting maps 55, for example, as shown in FIGS. 8A to 8E, and then the corner geometry reflecting unit 54 determines the number of shift speed difference between before and after downshift by referring to the corner geometry reflecting maps 55.

On the other hand, if, for example, the manual downshift operation is performed while the vehicle is running on a gentle curve (hereinafter called "mild corner") (S3-1), the corner geometry reflecting unit 54 determines whether the road is a straight road or not based on the steering angle determined by the corner geometry determination unit 62 described above (S3-2), and because the road is not a straight road (No in S3-2), determines whether the road is a sharp curve (hereinafter called "tight corner") or not (S3-5). Then, because the road in this case is not a tight corner (No in S3-5), the process proceeds to step S3-8.

Then, the corner geometry reflecting unit 54 refers to the corner geometry reflecting maps 55 shown in FIGS. 8A to 8E, based on the steering angle and the vehicle speed V determined by the corner geometry determination unit 62 described above. That is, the corner geometry reflecting unit 54 refers to: the map shown in FIG. 8A if the current shift speed (before downshift) is the eighth forward speed; the map shown in FIG. 8B if the current shift speed is the seventh forward speed; the map shown in FIG. 8C if the current shift speed is the sixth forward speed; the map shown in FIG. 8D if the current shift speed is the fifth forward speed; or the map shown in FIG. 8E if the current shift speed is the fourth forward speed. Note that, if the current shift speed is the third or lower forward speed, a downshift by two or more stages is unnecessary when considering the difference in gear ratio, and also a downshift by two or more stages is impossible from the second forward speed, as a matter of course, similarly to the case of the road gradient reflecting maps 53 described above. Therefore, maps for the first to third forward speeds are unnecessary as the corner geometry reflecting maps 55.

The corner geometry reflecting maps 55 shown in FIGS. 8A to 8E mentioned above are structured so that the number of shift speeds by which one downshift is achieved increases as the vehicle speed V [km/h] becomes lower, and also so that the number of shift speeds by which one downshift is achieved increases as the steering angle increases within the range in which the steering angle is judged to be that of a mild corner. Moreover, the corner geometry reflecting maps 55 are structured so that the number of shift speeds by which one downshift is achieved increases as the shift speed before downshift is higher. Note that, as will be described later in detail, the corner geometry reflecting maps 55 are structured so that the number of shift speeds by which one downshift is achieved is smaller in the range in which the steering angle is judged to be that of a tight corner, compared with the number of shift speeds in the range of the steering angle for a mild corner.

Then, the corner geometry reflecting unit 54 determines (changes and sets) the number of speeds to be downshifted for the mild corner by referring to the thus structured corner geometry reflecting maps 55 (S3-8). In this case, two levels of data depending on the steering angle are recorded for the mild corner in the corner geometry reflecting maps 55, and the number of speeds to be shifted is determined and decided depending on the steering angle. Thus, by determining the number of speeds to be shifted depending on the steering angle, the manual downshift can be performed more finely corresponding to the driver's requirement. Then, the corner geometry reflecting unit 54 performs the downshift to the determined shift speed (gear stage) by commanding the shift command unit 31 described above for the downshift by the determined number of speeds to be shifted (S3-9), and finishes the control (S3-10). Note that, in the corner geometry reflecting maps 55 of the present embodiment, the data of two levels are exemplified as recorded data for the steering angles on the mild corners. However, not limited to these examples, the data may be prepared as more finely segmented data based on the steering angle, and accordingly, the corner geometry reflecting maps 55 may be structured so as to enable the manual downshift more finely corresponding to the driver's requirement.

On the other hand, if, for example, the manual downshift operation is performed while the vehicle is running on the tight corner (S3-1), the corner geometry reflecting unit 54 determines whether the road is a tight corner or not (S3-5) based on the steering angle because the road is not a straight road (No in S3-2) based on the steering angle determined by the corner geometry determination unit 62 described above, and because the road in this case is a tight corner (Yes in S3-5), the process proceeds to step S3-6.

In the step S3-6, the corner geometry reflecting unit 54 determines (changes and sets) the number of speeds to be downshifted for the tight corner by referring to the above-described corner geometry reflecting maps 55 in the similar manner. In this case, the data in the corner geometry reflecting maps 55 are recorded so that the number of shift speeds by which one downshift is achieved is smaller than the number of shift speeds in the case of the steering angle for a mild corner; that is, the number of shift speeds by which one downshift is achieved is set so as to be smaller on the tight corner than that on the mild corner. Then, the corner geometry reflecting unit 54 performs the downshift to the determined shift speed (gear stage) by commanding the shift command unit 31 described above for the downshift by the determined number of speeds to be shifted (S3-7), and finishes the control (S3-10). Note that, if the driver operates the shift lever 21 from position "M" to position "D", the control described above is terminated.

According to the third embodiment as described above, the corner geometry reflecting unit 54 of the manual shift control unit 51 changes and sets the shift speed after downshift depending on the road condition when the downshift command has been operated by the shift lever 21 in the manual shift mode Mmode, and performs the downshift to the shift speed that has been changed and set. Therefore, the downshift depending on the road condition can be achieved by performing only one operation of the shift lever 21 for issuing the downshift command, and thus the downshift to the gear ratio desired by the driver can be accomplished quickly without involving a troublesome operation.

Specifically, because the corner geometry reflecting unit 54 changes and sets the shift speed after downshift depending on the corner geometry, in the case, for example, that the driver requires engine braking on a corner, the shift speed corresponding to the corner geometry can be appropriately reflected in the manual downshift.

In addition, because the corner geometry reflecting unit 54 changes and sets the shift speed after downshift so that the number of shift speed difference between before and after downshift is made larger (that is, so that the gear ratio width is made larger) on the mild corner than on the straight road or on the tight corner, the downshift on the mild corner can be performed so as to increase the engine braking force or the driving force relative to that on the straight road, and the downshift on the tight corner can be performed so as to prevent occurrence of a large engine braking force to ensure driving stability of the vehicle. That is, the downshift to the gear ratio desired by the driver can be appropriately achieved.

Moreover, because there are provided the corner geometry reflecting maps 55 each of which, for each shift speed before downshift, preliminarily stores the shift speeds after downshift corresponding to the corner geometry and the vehicle speed, complex calculation can be made unnecessary during manual downshifting, thus enabling a quick downshift depending on the corner geometry. Furthermore, because the vehicle speed V can be reflected in the shift speed after downshift, a required amount of the driving force or the engine braking force can be appropriately generated depending on the vehicle speed V. Thus, not only driveability can be improved, but also driving stability can be ensured when performing the manual downshift.

Fourth Embodiment

Figure 9:
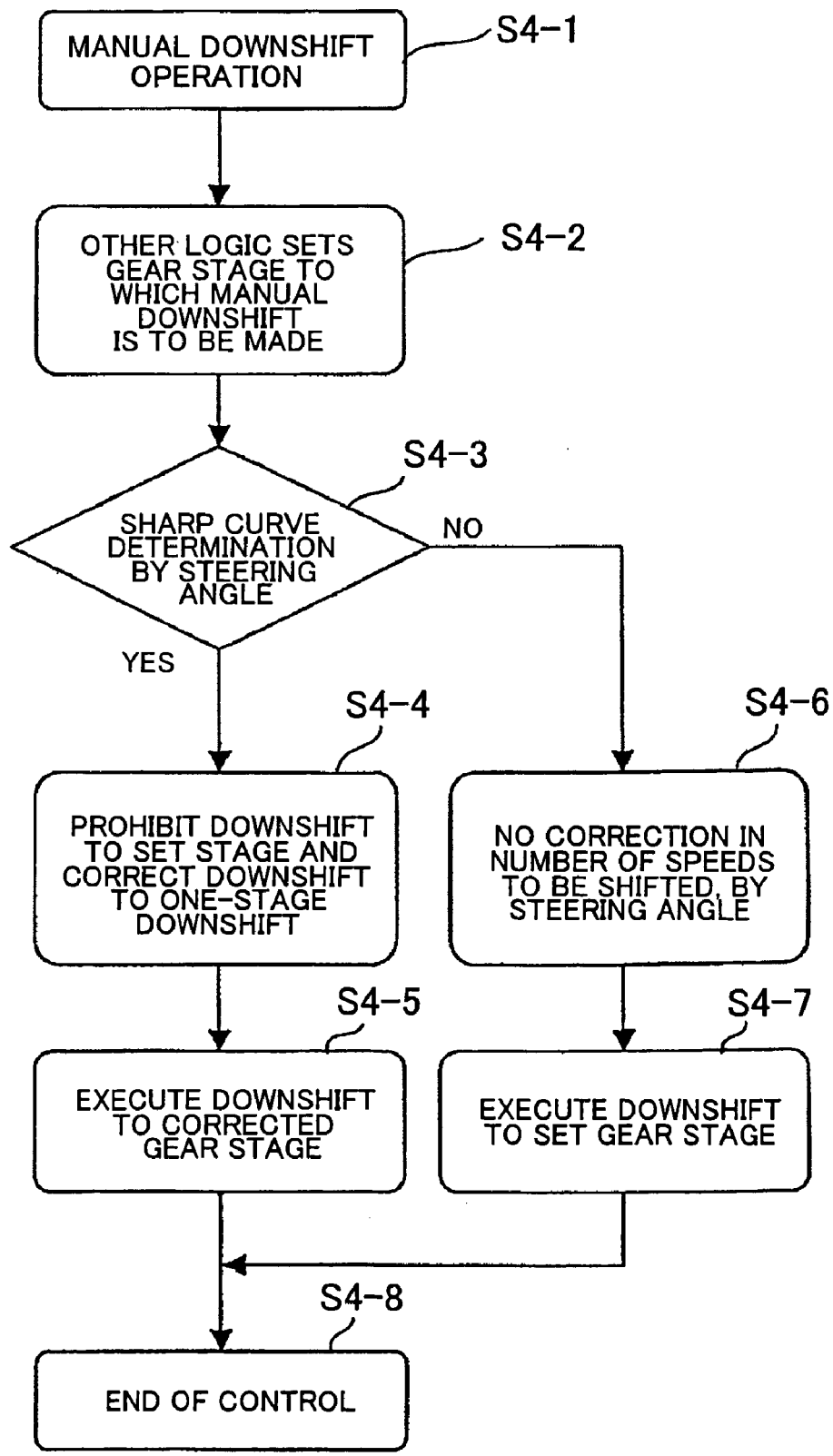
FIG. 9 is a flowchart showing manual downshift control that corrects a shift speed depending on corner geometry.

Next, description will be made of a fourth embodiment that takes into account the corner geometry by correcting the shift speed after downshift based on the corner geometry serving as a road condition, according to FIG. 9, with reference to FIG. 1.

In the same way as the first to third embodiments described above, for example, when the driver has operated the shift lever 21 from position "D" to position "M", control according to the fourth embodiment is started. For example, if the manual downshift operation is performed while the vehicle is running on a road other than the tight corner (S4-1), the gear ratio changing and setting unit 56 sets the shift speed (gear stage) to which the manual downshift is to be made, according to another logic that is different from the determination of shift speed based on the corner geometry described in the third embodiment, by, for example, referring to the gear ratio setting maps 57 (S4-2), similarly to the second embodiment described above.

Note that, as described above, the another logic can be a logic, for example, in which the shift speed to which the manual downshift is to be made is set depending on the driver's degree of intention to decelerate, the type of the driver, or the above-described road gradient, or in which the shift speed to which the manual downshift is to be made is set according to a fixed number of speeds to be shifted where some of the speeds are jumped over (skipped).

After the shift speed after downshift has been set by the gear ratio changing and setting unit 56 according to the another logic as described above, the corner geometry reflecting unit 54 determines whether the road is a tight corner (sharp curve) or not based on the steering angle determined by the corner geometry determination unit 62 described above (S4-3), and because the road in this case is not a tight corner (No in S4-3), the corner geometry reflecting unit 54 does not correct the number of speeds to be shifted based on the steering angle (S4-6). Then, the corner geometry reflecting unit 54 performs the downshift to the gear stage determined in the above-described step S4-2 (S4-7), and finishes the control (S4-8).

That is, in the case that the driver has performed the manual downshift operation on a road other than the tight corner as described above, there is no particular problem in driving stability of the vehicle even if a large engine braking force is generated. Therefore, in that case, the appropriate and quick manual downshift to the shift speed desired by the driver is given a high priority by the above-described another logic.

On the other hand, if, for example, the manual downshift operation is performed while the vehicle is running on the tight corner (S4-1), the corner geometry reflecting unit 54 determines whether the road is a tight corner or not based on the determination result of the above-mentioned corner geometry determination unit 62 (S4-3) after the gear ratio changing and setting unit 56 has set the shift speed to which the manual downshift is to be made according to the another logic as described above (S4-2), and because the road in this case is a tight corner (Yes in S4-3), the process proceeds to step 84-4.

Then, the corner geometry reflecting unit 54 prohibits (cancels) the downshift to the shift speed set by the gear ratio changing and setting unit 56 in the step S4-2 described above, and corrects the thus set shift speed to a shift speed after downshift that is below the current shift speed by one stage (S4-4). Then, the corner geometry reflecting unit 54 performs the downshift to the corrected shift speed after downshift by commanding the shift command unit 31 described above for the downshift to the corrected shift speed (one-stage downshift), that is, performs a downshift by one stage in the same way as a normal manual downshift (S4-5), and finishes the control (S4-8). Note that, if the driver operates the shift lever 21 from position "M" to position "D", the control described above is terminated.

Also in the fourth embodiment as described above, the corner geometry reflecting unit 54 of the manual shift control unit 51 changes and sets the shift speed after downshift depending on the road condition (particularly the tight corner) when the downshift command has been operated by the shift lever 21 in the manual shift mode Mmode, and performs the downshift to the shift speed that has been changed and set. Therefore, the downshift depending on the road condition can be achieved by performing only one operation of the shift lever 21 for issuing the downshift command. Thus, the downshift to the gear ratio desired by the driver can be accomplished quickly without involving a troublesome operation.

Specifically, because the corner geometry reflecting unit 54 changes and sets the shift speed after downshift by correcting, depending on the corner geometry (particularly the tight corner), the shift speed after downshift that has been set by the gear ratio changing and setting unit 56, the shift speed after downshift set by the gear ratio changing and setting unit 56 depending, for example, on the driver's degree of intention to decelerate or on the type of the driver can be made to be a downshifted shift speed that further takes the corner geometry into account. That is, a large engine braking force is prevented from occurring caused by a downshift with a large gear ratio width on the tight corner, thus also ensuring driving stability when performing the manual downshift.

Note that, in the present embodiments described above, description has been made of the cases in which the control device 1 is applied to the stepped automatic transmission 3 that can achieve eight forward speeds and two reverse speeds. However, it is needless to say that the present invention is not limited to these applications, but can also be applied to a continuously variable transmission such as, for example, a belt type CVT. When the continuously variable transmission is downshifted manually, the gear ratio is changed and set, instead of changing and setting the shift speed. In this case, the gear ratio that is changed depending on the road conditions can also be set continuously, for example, in a manner proportional to the level of road gradient or corner geometry.

Note also that, in the present embodiments, description has been made of the cases in which the respective parameters are used as road conditions, such as "road gradient" in the first and second embodiments, and "corner geometry (steering angle)" in the third and fourth embodiments. It is also possible, for example, to express these parameters as scores that are then integrally combined to be used as a level of the road conditions. In this case, the manual downshift can reflect the requirement of the driver by converting the level of the road conditions to a level of requirement for downshift. In the case of expressing the road conditions as scores as described above, other parameters (for example, navigation information and state of grip on the road surface (for example, snowy road or rainy road)) can also be included as road conditions.

Note moreover that, in the embodiments described above, description has been made of the cases in which, every time a manual downshift command is issued, the number of shift speeds to be downshifted is changed and set, and the downshift is performed to the thus set shift speed. However, if, for example, the driver has successively issued a plurality of manual downshift commands and all of the controls have been executed, the gear ratio may be shifted down to a level lower than the driver intended. Therefore, if the plurality of manual downshift commands are issued in a predetermined time, this control may be canceled and the downshift may be performed by one stage at a time as usual. Alternatively, even if the plurality of manual downshift commands are issued in a predetermined time, only one (only the first one) of the commands may be accepted.

The control device for an automatic transmission according to the present invention can be used in an automatic transmission mounted on a passenger vehicle, truck, bus, agricultural machine, or the like, and is particularly suitable for use in an automatic transmission that is required to allow a quick downshift when a downshift through finely spaced stages of gear ratios is manually commanded.

According to an exemplary aspect of the invention, the manual shift control unit changes and sets the gear ratio after downshift depending on the road conditions when the downshift command has been operated by the manual operation device in the manual shift mode, and performs the downshift to the gear ratio that has been changed and set. Therefore, the downshift depending on the road conditions can be achieved by performing only one operation of the manual operation device for issuing the downshift command. That is, the downshift to a gear ratio desired by a driver can be accomplished quickly without involving a troublesome operation.

According to an exemplary aspect of the invention, the road gradient reflecting unit changes and sets the gear ratio after downshift depending on the road gradient. Therefore, for example, in a case where the driver requires a driving force on an uphill road or an engine braking force on a downhill road, the gear ratio can be appropriately reflected in the downshift by manual operation so as to achieve a gear ratio corresponding to the road gradient.

According to an exemplary aspect of the invention, the road gradient reflecting unit changes and sets the gear ratio after downshift so that the gear ratio width between before and after downshift is made larger as the road gradient becomes larger. Therefore, the downshift can be performed so that the driving force increases on uphill roads relative to that on level roads, or so that the engine braking force increases on downhill roads relative to that on level roads. This makes it possible to quickly achieve the downshifted gear ratio desired by the driver.

According to an exemplary aspect of the invention, for each gear ratio before downshift, the road gradient reflecting map is provided that preliminarily stores the gear ratios after downshift corresponding to the road gradient and the vehicle speed. Therefore, a complex calculation can be made unnecessary during downshift by manual operation, thus enabling a quick downshift depending on the road gradient. In addition, because the vehicle speed can be reflected in the gear ratio after downshift, a required amount of the driving force or the engine braking force can be appropriately generated depending on the vehicle speed. Thus, not only can driveability be improved, but also driving stability can be ensured when downshifting by manual operation.

According to an exemplary aspect of the invention, the road gradient reflecting unit changes and sets the gear ratio after downshift by correcting, depending on the road gradient, the gear ratio after downshift that has been set by the gear ratio changing and setting unit. Therefore, the gear ratio after downshift set by the gear ratio changing and setting unit depending, for example, on the driver's degree of intention to decelerate or type of driver can be made to be a downshifted gear ratio that further takes the road gradient into account. That is, the downshift to the gear ratio desired by the driver can be appropriately achieved.

According to an exemplary aspect of the invention, the corner geometry reflecting unit changes and sets the gear ratio after downshift depending on the corner geometry. Therefore, for example, in the case where the driver requires engine braking on a corner, the gear ratio corresponding to the corner geometry can be appropriately reflected in the downshift by manual operation.

According to an exemplary aspect of the invention, the corner geometry reflecting unit changes and sets the gear ratio after downshift so that a gear ratio width between before and after downshift is made larger on a mild corner than on a straight road or on a tight corner. Therefore, the downshift on a mild corner can be performed so as to increase the engine braking force or the driving force relative to that on a straight road, and the downshift on a tight corner can be performed so as to prevent generation of a large engine braking force to ensure driving stability of the vehicle. That is, the downshift to the gear ratio desired by the driver can be appropriately achieved.

According to an exemplary aspect of the invention, for each gear ratio before downshift, the corner geometry reflecting map is provided that preliminarily stores the gear ratios after downshift corresponding to the corner geometry and the vehicle speed. Therefore, a complex calculation can be made unnecessary during downshift by manual operation, thus enabling a quick downshift depending on the corner geometry. In addition, because the vehicle speed can be reflected in the gear ratio after downshift, a required amount of the driving force or the engine braking force can be appropriately generated depending on the vehicle speed. Thus, not only can driveability be improved, but also driving stability can be ensured when downshifting by manual operation.

According to an exemplary aspect of the invention, the corner geometry reflecting unit changes and sets the gear ratio after downshift by correcting, depending on the corner geometry, the gear ratio after downshift that has been set by the gear ratio changing and setting unit. Therefore, the gear ratio after downshift set by the gear ratio changing and setting unit depending, for example, on the driver's degree of intention to decelerate or type of the driver can be made to be a downshifted gear ratio that further takes the corner geometry into account. Accordingly, a large engine braking force is prevented from being generated by a downshift with a large gear ratio width particularly on a tight corner, thus also ensuring driving stability when downshifting by manual operation.

According to an exemplary aspect of the invention, the automatic transmission is formed by the multi-stage automatic transmission that achieves a plurality of shift speeds by changing the transmission path of the speed change gear mechanism, and the manual shift control unit changes and sets the gear ratio after downshift by changing and setting, depending on the road conditions, the number of shift speeds to be downshifted by one issuance of the downshift command. Therefore, the downshift to a shift speed depending on the road conditions can be achieved by performing only one operation of the manual operation device for issuing the downshift command. That is, the downshift to the shift speed desired by the driver can be accomplished quickly without involving a troublesome operation.

What is claimed is:

1. A control device for an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the control device comprising:
 a road gradient determination unit that determines a road gradient during driving; and
 a manual shift control unit that changes and sets the gear ratio after downshift depending on road conditions when the downshift command has been operated by the manual operation device in the manual shift mode, and performs the downshift to the gear ratio that has been changed and set, wherein:
 the manual shift control unit includes a road gradient reflecting unit that changes and sets the gear ratio after downshift depending on the road gradient serving as the road condition,
 a gear ratio width between before and after the downshift is made larger as the road gradient becomes larger,
 the manual shift control unit stores road gradient reflecting maps each of which, for each gear ratio before downshift, preliminarily stores gear ratios after downshift corresponding to road gradient and vehicle speed, and
 the manual shift control unit obtains the vehicle speed, and changes and sets the gear ratio width based on the road gradient, the vehicle speed and the road gradient reflecting maps.

2. The control device for the automatic transmission according to claim 1, wherein:

the manual shift control unit includes a gear ratio changing and setting unit that changes and sets the gear ratio after downshift when the downshift command has been operated by the manual operation device, and the road gradient reflecting unit changes and sets the gear ratio after downshift by correcting, depending on the road gradient serving as the road condition, the gear ratio after downshift that has been set by the gear ratio changing and setting unit.

3. The control device for the automatic transmission according to claim 1, further comprising:

a corner geometry determination unit that determines corner geometry during driving, wherein the manual shift control unit includes a corner geometry reflecting unit that changes and sets the gear ratio after downshift depending on the corner geometry serving as the road condition.

4. The control device for the automatic transmission according to claim 3, wherein the corner geometry reflecting unit changes and sets the gear ratio after downshift so that the gear ratio width between before and after downshift is made larger on a mild corner than on a straight road or on a tight corner.

5. The control device for the automatic transmission according to claim 3, wherein the manual shift control unit stores corner geometry reflecting maps each of which, for each gear ratio before downshift, preliminarily stores gear ratios after downshift corresponding to corner geometry and vehicle speed.

6. The control device for the automatic transmission according to claim 3, wherein:

the manual shift control unit includes a gear ratio changing and setting unit that changes and sets the gear ratio after downshift when the downshift command has been operated by the manual operation device, and the corner geometry reflecting unit changes and sets the gear ratio after downshift by correcting, depending on the corner geometry serving as the road condition, the gear ratio after downshift that has been set by the gear ratio changing and setting unit.

7. The control device for the automatic transmission according to claim 1, wherein:

the automatic transmission is formed by a multi-stage automatic transmission that achieves a plurality of shift speeds by changing a transmission path of a speed change gear mechanism, and the manual shift control unit changes and sets the gear ratio after downshift by changing and setting, depending on the road conditions, the number of shift speeds to be downshifted by one issuance of the downshift command.

8. A method of operating an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device, the method comprising:

determining a road gradient during driving;

determining whether the downshift command has been operated by the manual operation device in the manual shift mode;

changing and setting the gear ratio after downshift depending on road conditions when the downshift command has been operated by the manual operation device in the manual shift mode; and performing the downshift to the gear ratio that has been changed and set; wherein:

the changing and setting of the gear ratio after downshift depends on the road gradient serving as the road condition, a gear ratio width between before and after the downshift is made larger as the road gradient becomes larger, road gradient reflecting maps each of which, for each gear ratio before downshift, preliminarily stores gear ratios after downshift corresponding to road gradient and vehicle speed is stored, and the vehicle speed is obtained, and the gear ratio width is changed and set based on the road gradient, the vehicle speed and the road gradient reflecting maps.

9. The method according to claim 8, wherein the changing and setting of the gear ratio after downshift is set by correcting, depending on the road gradient serving as the road condition, the gear ratio after downshift that has been set.

10. The method according to claim 8, further comprising:

determining a corner geometry during driving, wherein the changing and setting of the gear ratio after downshift depends on the corner geometry serving as the road condition.

11. The method according to claim 10, wherein the changing and setting of the gear ratio after downshift is set such that the gear ratio width between before and after downshift is made larger on a mild corner than on a straight road or on a tight corner.

12. The method according to claim 10, wherein corner geometry reflecting maps each of which, for each gear ratio before downshift, preliminarily stores gear ratios after downshift corresponding to corner geometry and vehicle speed is stored.

13. The method according to claim 10, wherein the changing and setting of the gear ratio after downshift is set by correcting, depending on the corner geometry serving as the road condition, the gear ratio after downshift that has been set.

14. An automatic transmission system comprising:

an automatic transmission capable of operating in an automatic shift mode in which a gear ratio is automatically selected based on driving conditions of a vehicle, and also capable of operating in a manual shift mode in which the gear ratio is changed based on an upshift command or a downshift command by manual operation of a manual operation device;

a road gradient determination unit that determines a road gradient during driving; and a manual shift control unit that changes and sets a gear ratio after downshift depending on road conditions when the downshift command has been operated by the manual operation device in the manual shift mode, and performs the downshift to the gear ratio that has been changed and set, wherein:

the manual shift control unit includes a road gradient reflecting unit that changes and sets the gear ratio after downshift depending on the road gradient serving as the road condition, a gear ratio width between before and after the downshift is made larger as the road gradient becomes larger, the manual shift control unit stores road gradient reflecting maps each of which, for each gear ratio before downshift, preliminarily stores gear ratios after downshift corresponding to road gradient and vehicle speed, and the manual shift control unit obtains the vehicle speed, and changes and sets the gear ratio width based on the road gradient, the vehicle speed and the road gradient reflecting maps.

* * * * *